United States Patent [19]
Nakashima

[11] Patent Number: 6,085,982
[45] Date of Patent: Jul. 11, 2000

[54] PC CARD CAPABLE OF SWITCHING CARD INFORMATION STRUCTURES

[75] Inventor: Tatsuya Nakashima, Yokosuka, Japan

[73] Assignee: Murata Manufacturing Co., Ltd., Japan

[21] Appl. No.: 08/984,597

[22] Filed: Dec. 3, 1997

[30] Foreign Application Priority Data

Dec. 4, 1996 [JP] Japan ................................. 8-339018

[51] Int. Cl.$^7$ ................................................ G06K 19/06
[52] U.S. Cl. ........................ 235/492; 235/375; 235/451; 712/11; 712/32
[58] Field of Search ................................. 235/492, 375, 235/376, 380, 451; 902/26; 712/11, 32

[56] References Cited

U.S. PATENT DOCUMENTS

| | | | |
|---|---|---|---|
| 5,329,491 | 7/1994 | Brown et al. ...................... | 365/185.35 |
| 5,613,092 | 3/1997 | Lim et al. ............................ | 395/500 |
| 5,778,195 | 7/1998 | Gochi ................................. | 710/102 |
| 5,797,031 | 8/1998 | Shapiro et al. ..................... | 395/828 |
| 5,805,929 | 9/1998 | Connolly et al. .................... | 710/49 |

*Primary Examiner*—Michael G Lee
*Attorney, Agent, or Firm*—Ostrolenk, Faber, Gerb & Soffen, LLP

[57] ABSTRACT

A PC card includes a plurality of functions and a plurality of CISs each for a single function or a combination of functions among the plurality of functions. A selection-signal input device inputs the CIS signal corresponding to the function to be used. A selection-signal determination section determines the designated CIS. According to the determination result, a CIS-switching setting section sets the designated CIS as the CIS to be read by a personal computer. A function-power-source switching control section supplies a power voltage only to the function corresponding to the designated CIS. An interface-bus-switching control section connects an interface bus for the function corresponding to the designated CIS to an interface bus connected to the main control section of the PC card.

8 Claims, 2 Drawing Sheets

PC CARD CAPABLE OF SWITCHING CARD INFORMATION STRUCTURES

BACKGROUND OF THE INVENTION

1. Field of the Invention

The present invention relates to a PC card apparatus controlling the switching of a plurality of card information structures (hereinafter called CISs) provided for a PC card and also controlling the switching of power sources for a plurality of functions provided for the PC card in synchronization with the switching of the CISs.

2. Description of the Related Art

A PC card is inserted into a slot of a personal computer and used. It is provided with a CIS, which indicates the attribute information of the PC card, and functions such as a modem, a local area network (LAN), and memory.

In a conventional general PC card, one function and one CIS indicating the attribute information of the function are provided, as shown in FIG. 3A. It is of a so-called single type. When such a single-type PC card 1 is used, if a plurality of functions are to be used in a time-series manner, a plurality of PC cards having different functions need to be inserted into a personal computer alternately, which is troublesome.

To eliminate this troublesome work of changing PC cards, a so-called multiple-type PC card has been recently used which provides two functions, such as a modem and a LAN function or a modem and memory, and one CIS indicating the attribute information of the two functions, as shown in FIG. 3B. To use such a multiple-type PC card, a driver (driving mechanism) having multifunction capability needs to be provided for a personal computer. When a multiple-type PC card is inserted into a personal computer having this driver having multifunction capability, the attribute information of two functions, function 1 and function 2, is read through one CIS to the personal computer and the two functions become available.

CIS data indicating the attribute information of the PC card 1 is provided for the card according to a rule which conforms to the PC card standard, which is standardized by PCMCIA of the United States and JEIDA of Japan. A personal computer reads data from the PC card 1 according to the card standard.

When a personal computer is not provided with a driver having multifunction capability, since the personal computer can read data only from a single-type PC card, even if a multiple-type PC card is inserted in the personal computer, the card cannot be used.

When a multiple-type PC card is inserted into a personal computer provided with a driver having multifunction capability, two functions provided for the card can be used. If only one of the two functions is to be used, for example, since the personal computer reads CIS data for the two functions and makes the environment ready for the two functions, the function not to be used is also made available with the corresponding circuit being driven, and power is wasted.

When the PC card 1 is provided with two functions, a modem and an ATA memory, the modem needs a current of about 120 mA and the ATA memory requires a current of about 1 mA (when idling). If only the function of ATA memory is used, although just a current of 1 mA is required, since the function of the modem is also made ready with the corresponding circuit being driven, a current of 121 mA is consumed. In the PC card 1 provided with the functions of a modem and an ATA memory, usually the ATA memory is relatively frequently used, and the function of the modem is generally used only for communication less frequently. Every time when the ATA memory is used, a high current flows into the modem and the current is wasted. Therefore an improvement is demanded.

SUMMARY OF THE INVENTION

Accordingly, it is an object of the present invention to provide a PC card apparatus which allows a PC card provided with a plurality of CISs to be used with a personal computer not provided with a driver having multifunction capability, and which also allows a PC card provided with a plurality of CISs to be used, in a power-saving manner in which only the current corresponding to a function used among the plurality of functions is required and a wasteful current for making a not-used function ready is not needed, with a personal computer provided with a driver having multifunction capability.

The foregoing object is achieved in one aspect of the present invention through the provision of a PC card apparatus including: a PC card provided with a plurality of functions and a plurality of card information structures (CISs: indicating card attribute information) each for a single function or a combination of functions among the plurality of functions; selection-signal input means for inputting a CIS selection signal to the PC card; a CIS-switching setting section for determining the selection signal input by the selection-signal input means and for setting the designated CIS as the CIS to be read by a personal computer; and a function-power-source switching control section for turning on a power source for the function corresponding to the CIS designated according to the selection signal input by the selection-signal input means.

The PC card apparatus may further includes an interface-bus-switching control section for switching interface-bus connection for the function corresponding to the designated CIS when the function-power-source switching control section switches the power source.

The PC card apparatus may be configured such that the selection-signal input means is formed of a switch provided for the PC card and the ON or OFF signal of the switch is used as a CIS selection signal.

The PC card apparatus may be configured such that the selection-signal input means is formed of a connector section provided for the PC card and a connection or disconnection signal indicating that a connector is connected to or disconnected from the connector section is used as a CIS selection signal.

The PC card apparatus may be configured such that the selection-signal input means is formed of software having a program for outputting a CIS selection signal, provided for the personal computer.

Since according to the present invention a PC card is provided with a plurality of functions and a plurality of CISs each for a single function or a combination of functions, selection-signal input means designates the CIS to be used among the plurality of CISs, and the designated CIS is set as the CIS to be read by a personal computer, when the personal computer is provided with a driver having multifunction capability, the functions provided for the PC card operate without any problem by specifying a CIS for a single function or for a combination of functions provided for the PC card, as required.

Even when the personal computer is not provided with a driver having multifunction capability, if the selection-signal input means specifies a CIS for a single function, the designated CIS for the single function is set as the CIS to be read by the personal computer among a plurality of CISs provided for the PC card. The personal computer reads the designated CIS and operates the function corresponding to the CIS as if the personal computer were provided with a single-type PC card having only the designated CIS. Therefore, when a plurality of CISs each for a single function are provided, a plurality of different functions can be operated sequentially in a time-series manner without changing the PC card.

When the CIS to be used is specified, since the function-power-source switching control section supplies a power voltage only to the function corresponding to the designated CIS, and a power voltage is automatically not supplied to a function not to be used, power is not wasted unlike the conventional case in which a power voltage is supplied to a function not to be used because the function is maintained ready, and thereby the PC card is used in an energy-saving manner.

When the interface-bus-switching control section is provided, if the CIS to be used is specified, since an interface bus only for the function corresponding to the designated CIS can be used, and an interface bus is blocked for a function not to be used, the personal computer can omit software signal processing for arranging the environment corresponding to the function not to be used, and thereby signal processing is efficiently performed. With power-source-switching control by the function-power-source switching control section and interface-bus-switching control by the interface-bus-switching control section, when the CIS to be used is designated, the function corresponding to the designated CIS and the other functions are completely switched in terms of hardware and software.

When the selection-signal input means is formed of a switch, since the user of the PC card can select the CIS to be used just by operating a switch, it is very convenient. In addition, since the position to which the switch is set can be seen externally, it is easy to determine which function is operated by the personal computer among a plurality of functions provided for the PC card.

When the selection-signal input means is formed of a connector section, if a connector for communication is connected to the connector section, for example, automatic selection of the CIS for the modem can be implemented. When the connector for communication is disconnected from the connector section, automatic selection of a CIS for a function other than the modem, for example, the CIS for the ATA memory, can be implemented. It is very convenient.

When the selection-signal input means is formed of software having a program for outputting a CIS selection signal, provided for the personal computer, a component for selecting a CIS, such as a switch, is not required and work required for mounting the component on the PC card is also omitted. Therefore, the PC card is manufactured at less cost.

DESCRIPTION OF THE PREFERRED EMBODIMENTS

In the present invention, a PC card is provided with a plurality of functions and a plurality of CISs each for a single function or a combination of functions, and the PC card is inserted into a slot of a personal computer. A signal for selecting the CIS corresponding to the function to be used among the plurality of CISs is sent from a selection-signal input means to the PC card.

A CIS-switching setting section identifies the selection signal sent from the selection-signal input means, determines the CIS corresponding to the function (single function or a combination of functions) to be used among the plurality of CISs stored in the PC card, and set the CIS corresponding to the function to be used as the CIS to be read by the personal computer.

A function-power-source switching control section switches only the power source for the function corresponding to the selected CIS to the ON state according to the selection signal sent from the selection-signal input means. A power voltage is supplied only to the function to be used, and the function is made ready. An interface-bus-switching control section connects an interface bus for the function corresponding to the selected CIS to the control section of the PC card when the function-power-source switching control section switches the power source. The function corresponding to the selected CIS is made ready in software and in hardware. The personal computer reads the information of the CIS set by the CIS-switching setting section, and drives only the circuit corresponding to the function to be used to efficiently operate the function.

A CIS-switching mechanism for a PC card is described in our co-pending U.S. patent application Ser. Nos. 08/984,232 and 08/984,433, filed on even date herewith. The disclosures of the applications are incorporated herein by reference.

Figure 1:
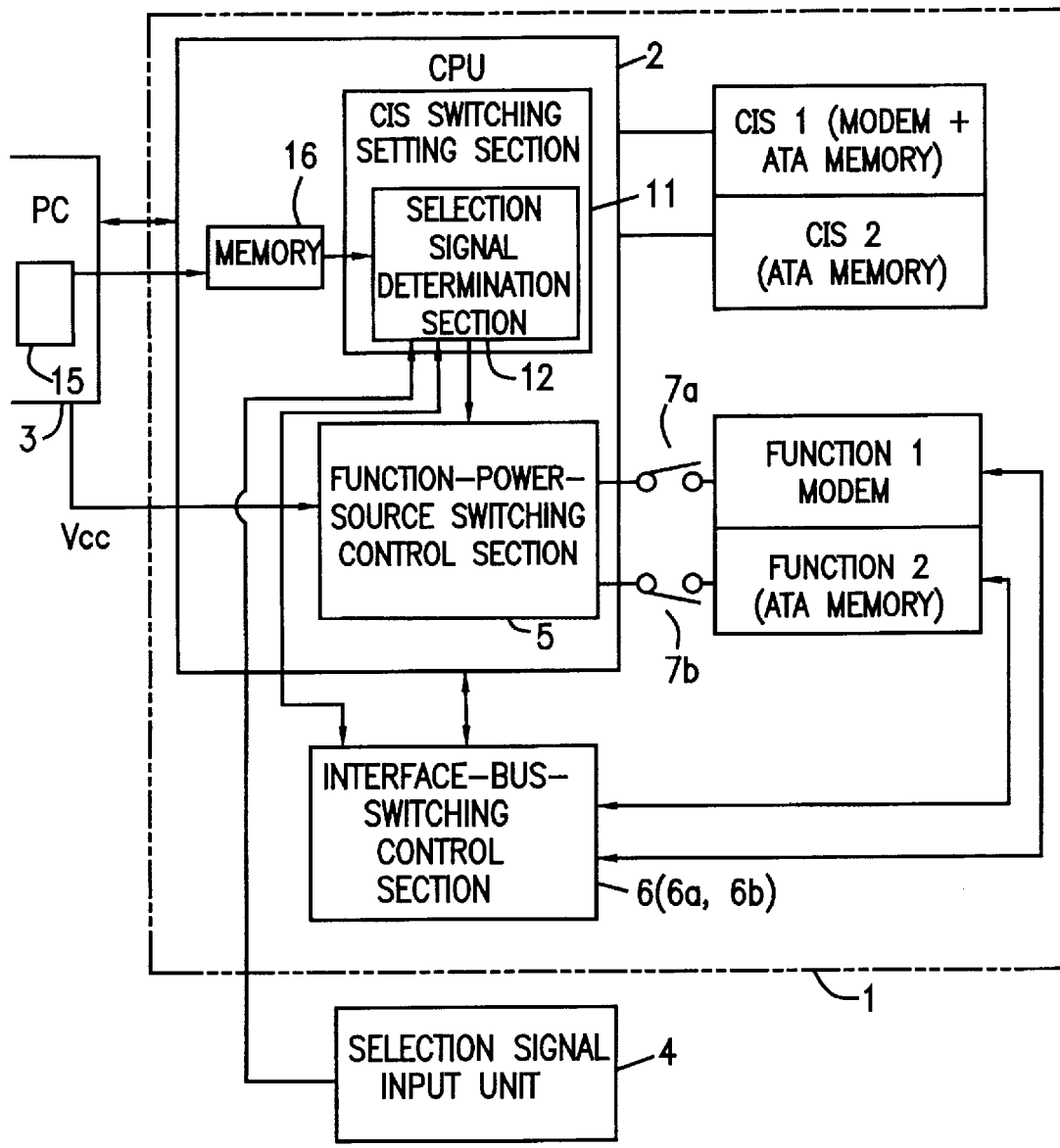
FIG. 1 is a block diagram of a main section of a PC card apparatus according to an embodiment of the present invention.
Figure 2:
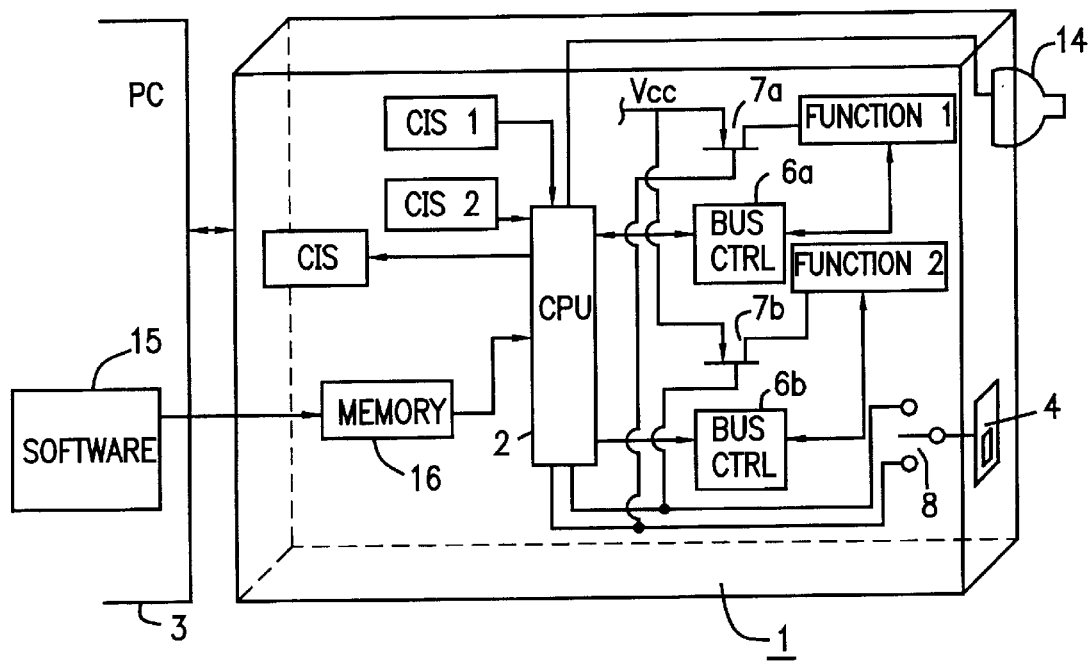
FIG. 2 is a view of a configuration of the PC card apparatus according to the embodiment of the present invention.
Figure 3A:
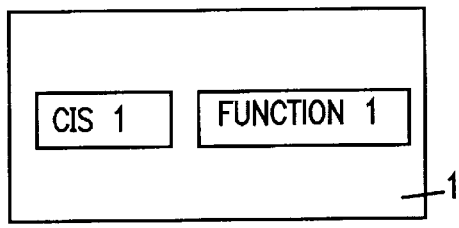
FIGS. 3A and 3B are views showing conventional single-type and multiple-type PC cards provided with a function or functions and the corresponding CISs.
Figure 3B:
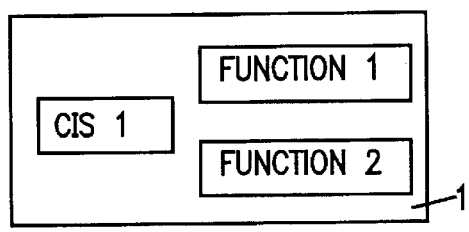

Embodiments of the present invention will be described below by referring to the drawings. FIG. 2 shows a general configuration of an embodiment according to the basic principle of the present invention. FIG. 1 shows a detailed configuration of a CIS-switching mechanism provided for a main control section 2 shown in FIG. 2.

A PC card 1 is provided with a plurality of functions, such as modem, LAN, and ATA memory functions, function 1 to function N (N is an integer more than 1) and a plurality of CISs each having the attribute information of a single function or a combination of functions, CIS 1 to CIS M (M is an integer more than 1). In FIGS. 1 and 2, to make the contents of the present invention easy-to-understand, two functions, function 1 and function 2, and two CISs are provided.

In FIG. 1, function 1 indicates a modem function and function 2 indicates an ATA memory function. CIS 1 includes the attribute information of the combination of functions of the modem and the ATA memory corresponding to function 1 and function 2. CIS 2 has the attribute information of the ATA memory corresponding to function 2. The PC card provided with the modem and ATA memory functions, CIS 1 corresponding to these functions, and CIS 2 corresponding to the ATA memory function will be described below in detail.

The PC card 1 is also provided with a main control section 2 for setting the CIS corresponding to the function to be used as a CIS to be read by a personal computer 3, and an interface-bus-switching control section 6. In the present embodiment, the main control section 2 is formed of a computer (CPU) circuit. The main control section 2 is configured such that a selection signal for selecting the CIS to be used is sent from selection-signal input means 4 to the main control section 2.

The main control section 2 is provided with a function-power-source switching control section 5 and a CIS-switching setting section 11. The CIS-switching setting section 11 includes a selection-signal determination section 12.

The selection-signal determination section 12 receives a selection signal from the selection-signal input means 4 and determines the designated CIS according to the selection signal. Whether CIS 1 for both the modem and ATA memory functions or CIS 2 only for the ATA memory function is designated is determined.

The CIS-switching setting section 11 sets the CIS designated by the selection signal as a CIS to be read by the personal computer 3 according to the result determined by the selection-signal determination section 12. When both modem and ATA memory functions are designated by the selection signal, for example, in other words, when CIS 1 is designated, CIS 1 is set to be read by the personal computer 3.

According to this CIS-switching setting performed by the CIS-switching setting section 11, the personal computer 3 reads CIS-1 data and arranges the environment such that both modem and ATA memory functions can be used at the same time.

When the selection-signal determination section 12 determines that CIS 2 corresponding to the ATA memory function is designated by a selection signal, the CIS-switching setting section 11 sets CIS 2 to be read by the personal computer 3. As a result, the personal computer 3 reads CIS-2 data and arranges the environment such that the ATA memory function can be used.

The function-power-source switching control section 5 switches a power voltage Vcc supplied from the personal computer 3 to function 1 or function 2 according to a determination signal for the CIS determined by the selection-signal determination section 12. Specifically, when the selection-signal determination section 12 determines that CIS 1 is designated, switches 7a and 7b are turned on to apply the power voltage supplied from the personal computer 3 to function 1, the modem, and function 2, the ATA memory. When the selection-signal determination section 12 determines the selection of CIS 2, the switch 7a is turned off and the switch 7b is turned on to apply the power voltage supplied from the personal computer 3 only to function 2, the ATA memory. In this way, the function-power-source switching control section 5 switches the power voltage supplied from the personal computer 3 such that it is applied only to the function corresponding to the selected CIS.

In FIG. 2, the switches 7a and 7b are formed of transistors. They may be formed of other switching devices, such as MOS FETs.

The interface-bus-switching control section 6 switches interface buses connecting the main control section 2 to function 1 or function 2 when the function-power-source switching control section 5 switches the power source for each function. Specifically, according to a signal indicating the determination of CIS designation sent from the selection-signal determination section 12, when the selection-signal determination section 12 determines that CIS 1 is designated, the interface bus connected to each of function 1 and function 2 is connected to the interface bus connected to the main control section 2. When the selection-signal determination section 12 determines that CIS 2 is designated, the interface bus connected to function 1 is blocked and only the interface bus connected to function 2 is connected to the interface bus connected to the main control section 2. In this way, according to the designated CIS, the interface-bus-switching control section 6 connects only the interface bus connected to the function corresponding to the selected CIS to the interface bus connected to the main control section 2.

In FIG. 1, the interface-bus-switching control section 6 is provided with an interface-bus-switching control section 6a for switching the interface bus connected to function 1 and an interface-bus-switching control section 6b for switching the interface bus connected to function 2. Function 1 and function 2 are switched by the separate interface-bus-switching control sections 6a and 6b.

Since the power voltage is supplied only to the function corresponding to the selected CIS according to the designated CIS in the present embodiment, when only function 2, the ATA memory function, is designated, for example, the power voltage is supplied only to the ATA memory and is not supplied to function 1. The problem described before can be positively solved in which power is wasted when a multiple-type PC card having modem and ATA memory functions is used in the conventional system, because the power voltage is supplied to the modem function although only the ATA memory is to be used.

When only the ATA memory is used with the conventional multiple-type PC card, since the modem circuit is also driven together as described above, a current of 121 mA is required if the ATA memory consumes a current of 1 mA and the modem consumes a current of 120 mA. On the other hand, a current of 1 mA, which is required for driving the ATA memory, is used in the present embodiment, and power consumption is substantially reduced as compared with the conventional case.

Since the interface-bus switching control section 6 (6a and 6b) is provided to connect the interface bus corresponding only to the function related to the designated CIS to the interface bus connected to the main control section 2, only the designated function is allowed to transfer a signal with the main control section 2 and the other functions not related to the designated CIS cannot transfer a signal with the main control section 2. Since signal connection is also switched in software between the main control section 2, and the function related to the designated CIS and the other functions, the personal computer 3 does not need to arrange the software environment for the functions not to be used. Therefore, unnecessary signal processing is omitted.

The selection-signal input means 4 can be configured in various signal-input ways. FIG. 2 shows a case in which the selection-signal input means 4 is formed of the switch 8.

When the switch 8 is used as the selection-signal input means 4, the ON signal of the switch 8 serves as a designation signal for CIS 1, which is for both modem and ATA memory, and the OFF signal serves as a designation signal for CIS 2, which is for the ATA memory only.

With this configuration, the selection-signal determination section 12 determines when the switch 8 sends the ON signal that it designates CIS 1, and when the switch 8 sends the OFF signal that it designates CIS 2. The CIS-switching setting section 11 sets the CIS to be read by the personal computer 3 according to the determination result of the selection-signal determination section 12. At the same time, the power voltage and the interface bus are switched. When the switch 8 is turned on, both modem and ATA memory can be used at the same time. When the switch 8 is turned off, only the ATA memory can be used.

As shown by a two-dot chain line in FIG. 2, the selection-signal input means can be formed of a connector section 14. In this case, for example, a connection signal indicating that a connector for communication is connected to the connector section 14 is used as a selection signal for designating CIS 1 and a non-connection signal indicating that the connector for communication is not connected to the connector section 14 is used as a selection signal for designating CIS 2, and they are applied to the selection-signal determination section 12.

As a result, when a connector for personal-computer communication is connected to the connector section 14, the selection-signal determination section 12 determines that CIS 1 is designated as the CIS to be read by the personal computer 3, and the CIS-switching setting section 11 sets CIS 1 as the CIS to be read by the personal computer 3.

When the connector for communication is disconnected from the connector section 14, the selection-signal determination section 12 determines that CIS 2 is designated, and the CIS-switching setting section 11 selects CIS 2 as the CIS to be read by the personal computer 3. Only the ATA memory is used.

When the switch 8 serves as the selection-signal input means, if the PC card 1 is provided with a plurality of CISs, a plurality of switches 8 are provided accordingly. When the connector section 14 serves as the selection-signal input means, the switch 8 is not required on the PC card 1.

As shown by a two-dot chain line in FIG. 2, the selection-signal input means 4 can be formed of software 15 having a program for outputting a switch signal in the personal computer 3. In this case, the PC card 1 is provided with a memory 16 for storing the switch signal output from the software 15 as shown by two-dot chain lines in FIGS. 1 and 2. The selection-signal determination section 12 reads the switch signal stored in the memory 16 and determines either of CIS 1 and CIS 2 is designated. According to the determination result of the selection-signal determination section 12, the CIS-switching setting section 11 sets the designated CIS as the CIS to be read by the personal computer 3. Switching between the simultaneous use of the modem and the ATA memory and the single use of only the ATA memory is performed according to the switch signal from the software 15.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A PC card, comprising:

a plurality of functions;

a plurality of card information structures (CISs) containing respective card attribute information for a combination of said functions;

a selection-signal input device for inputting a CIS selection signal to said PC card, the CIS selection signal identifying which of said CISs is to be selected;

a CIS-switching setting section discriminating the CIS selection signal and setting a designated CIS to be read by a personal computer; and a function-power-source switching control section turning on a power source only for the function corresponding to the designated CIS as a function of the CIS selection signal.

2. A PC card apparatus according to claim 1, further comprising an interface-bus-switching control section switching an interface-bus connection for the function corresponding to the designated CIS when said function-power-source switching control section switches the power source.

3. A PC card apparatus according to claim 2, wherein said selection-signal input device is formed of a switch provided at said PC card and the ON or OFF signal of said switch is used as a CIS selection signal.

4. A PC card apparatus according to claim 2, wherein said selection-signal input device is formed of a connector section provided at said PC card and a connection or disconnection signal indicating that a connector is connected to or disconnected from said connector section is used as a CIS selection signal.

5. A PC card apparatus according to claim 2, wherein said selection-signal input device is formed of software having a program for outputting a CIS selection signal.

6. A PC card apparatus according to claim 1, wherein said selection-signal input device is formed of a switch provided at said PC card and the ON or OFF signal of said switch is used as a CIS selection signal.

7. A PC card apparatus according to claim 1, wherein said selection-signal input device is formed of a connector section provided at said PC card and a connection or disconnection signal indicating that a connector is connected to or disconnected from said connector section is used as a CIS selection signal.

8. A PC card apparatus according to claim 1, wherein said selection-signal input device is formed of software having a program for outputting a CIS selection signal.

\* \* \* \* \*